(12) United States Patent
Franck

(10) Patent No.: US 7,092,180 B2
(45) Date of Patent: Aug. 15, 2006

(54) ASYMMETRY CORRECTION FOR MAGNETO-RESISTIVE HEADS

(75) Inventor: Stephen J. Franck, Felton, CA (US)

(73) Assignee: Agere Systems Inc., Allentown, PA (US)

( * ) Notice: Subject to any disclaimer, the term of this patent is extended or adjusted under 35 U.S.C. 154(b) by 104 days.

(21) Appl. No.: 10/817,408

(22) Filed: Apr. 1, 2004

(65) Prior Publication Data

US 2005/0219729 A1 Oct. 6, 2005

(51) Int. Cl.
*G11B 5/09* (2006.01)

(52) U.S. Cl. ......................... 360/46; 327/317
(58) Field of Classification Search .......... 330/252–53; 327/317, 551–53; 360/46
See application file for complete search history.

(56) References Cited

U.S. PATENT DOCUMENTS

| | | | | |
|---|---|---|---|---|
| 6,043,943 A * | 3/2000 | Rezzi et al. | ............. | 360/46 |
| 6,147,828 A * | 11/2000 | Bloodworth et al. | ......... | 360/65 |
| 6,449,110 B1 * | 9/2002 | DeGroat et al. | ............. | 360/46 |
| 6,587,292 B1 | 7/2003 | Ashley et al. | ................ | 360/39 |
| 6,633,447 B1 | 10/2003 | Franck et al. | ................. | 360/67 |
| 6,707,623 B1 * | 3/2004 | Pisati et al. | .................... | 360/25 |

\* cited by examiner

*Primary Examiner*—Andrea Wellington
*Assistant Examiner*—Dan I Davidson

(57) ABSTRACT

An asymmetry-reducing circuit adapted to process an input signal having positive and negative pulses of different amplitudes and generate a corresponding balanced signal having positive and negative pulses of substantially uniform amplitudes. The asymmetry-reducing circuit balances the input signal by providing signal contributions corresponding to the second and third orders of the input signal. In a representative embodiment, the asymmetry-reducing circuit includes a differential amplifier and a plurality of arrayed MOS transistors connected to its inputs and outputs such that source-to-drain conductance of the transistors provides input and feedback resistances to the amplifier. A switch set selectively couples the fingers (gates) of the transistors to the input signal to modulate the source-to-drain conductance with said signal such that the input and feedback resistances change in a complementary manner. Advantageously, circuits of the invention can correct signal asymmetry within a relatively wide asymmetry range.

17 Claims, 6 Drawing Sheets

US 7,092,180 B2

ASYMMETRY CORRECTION FOR MAGNETO-RESISTIVE HEADS

BACKGROUND OF THE INVENTION

1. Field of the Invention

The present invention relates to magnetic disk drives and, more specifically, to signal processing circuits for magneto-resistive (MR) heads.

2. Description of the Related Art

The principle of operation of MR heads is based on the ability of metals to change their resistance in the presence of a magnetic field. A typical MR head has an MR element composed of a thin film (e.g., about 250 nm in thickness) of Ni—Fe alloy, also called permalloy, which converts magnetic field variations at the surface of a magnetic storage medium (e.g., a magnetic platter) into resistance variations. The resistance variations are then converted into a differential voltage swing at the output of the MR head.

MR technology solves numerous problems associated with magneto-inductive heads, such as the dependence of signal amplitude on the rotational speed of the magnetic disk. However, MR heads have created new challenges for disk drive designers. One problem is the asymmetry in the response of a biased MR element to magnetic flux changes of opposite polarity. As a result, positive and negative pulses in the output signal of the MR head have different amplitudes, which impairs both servo and read channel performance in the disk drive.

SUMMARY OF THE INVENTION

Problems in the prior art are addressed, in accordance with the principles of the present invention, by an asymmetry-reducing circuit adapted to process an input signal having positive and negative pulses of different amplitudes and generate a corresponding balanced signal having positive and negative pulses of substantially uniform amplitudes. The asymmetry-reducing circuit balances the input signal by providing signal contributions corresponding to the second and third orders of the input signal. In a representative embodiment, the asymmetry-reducing circuit includes a differential amplifier and a plurality of arrayed MOS transistors connected to its inputs and outputs such that source-to-drain conductance of the transistors provides input and feedback resistances to the amplifier. A switch set selectively couples the fingers (gates) of the transistors to the input signal to modulate the source-to-drain conductance with said signal such that the input and feedback resistances change in a complementary manner. Advantageously, circuits of the invention can correct signal asymmetry within a relatively wide asymmetry range.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
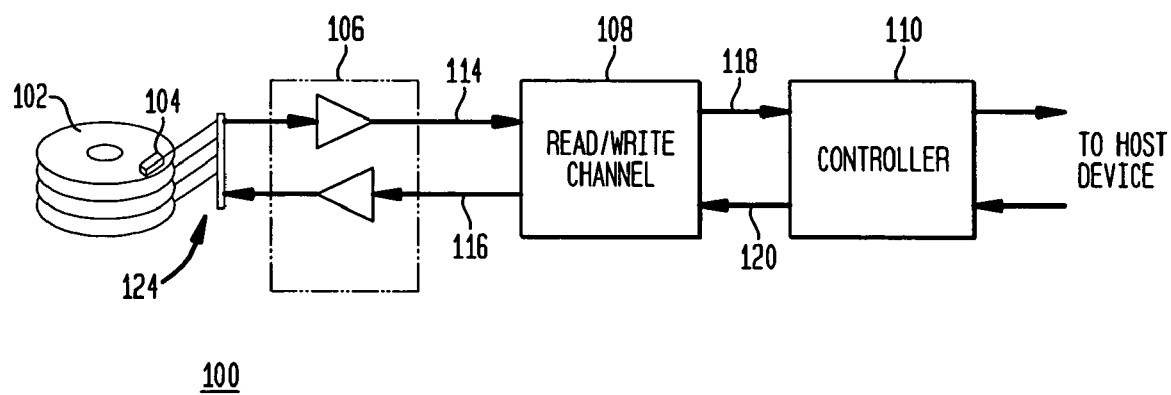
FIG. 1 shows a block diagram of an exemplary disk drive, in which the present invention can be practiced.

FIG. 1 shows a block diagram of an exemplary disk drive 100, in which the present invention can be practiced. Disk drive 100 is coupled to a host device, e.g., a computer, and includes one or more magnetic platters 102 mounted on a spindle motor (not shown), one or more read/write heads 104 mounted on an actuator assembly 124, amplifiers 106, a read/write channel 108, and a controller 110. Read/write channel 108 is coupled via interfaces 114 and 116 to amplifiers 106 and via interfaces 118 and 120 to controller 110. For clarity, certain components of disk drive 100, e.g., the servo/actuator motor control, are not shown in FIG. 1.

To read from disk drive 100, the host device provides to controller 110 a location identifier for the data to be retrieved. Based on the location identifier, controller 110 determines the actual physical location, e.g., the cylinder and sector, corresponding to the data on platters 102. Controller 110 then generates an appropriate control signal for actuator assembly 124 to position read/write heads 104 such that they can access that physical location. With read/write heads 104 in the proper position, platters 102 are spun under the heads, which causes each head to generate an analog signal corresponding to the magnetic flux reversals representing data on the platters. The analog signal is then amplified in amplifiers 106 and applied via interface 114 to read/write channel 108. As will be discussed in more detail below, read/write channel 108 decodes the amplified signal and converts it into a digital binary signal that is passed via interface 118 to controller 110. Controller 110 may apply additional processing, e.g., caching and error detection/correction, to the data carried by the binary signal before providing the data to the host device. The additional processing is usually intended to increase the operating speed and/or reliability of disk drive 100.

To write to disk drive 100, the host device provides to controller 110 data to be stored along with a location identifier to be used. Based on the location identifier, controller 110 generates an appropriate control signal for actuator assembly 124 to properly position read/write heads 104. Controller 110 then sends the data via interface 120 to read/write channel 108. Read/write channel 108 encodes the data and generates an appropriate analog signal that is applied via interface 116 and amplifiers 106 to read/write heads 104. With read/write heads 104 in the proper position, platters 102 are spun under the heads, which causes each head to impart magnetic flux reversals corresponding to the data onto the platters.

Figure 2:
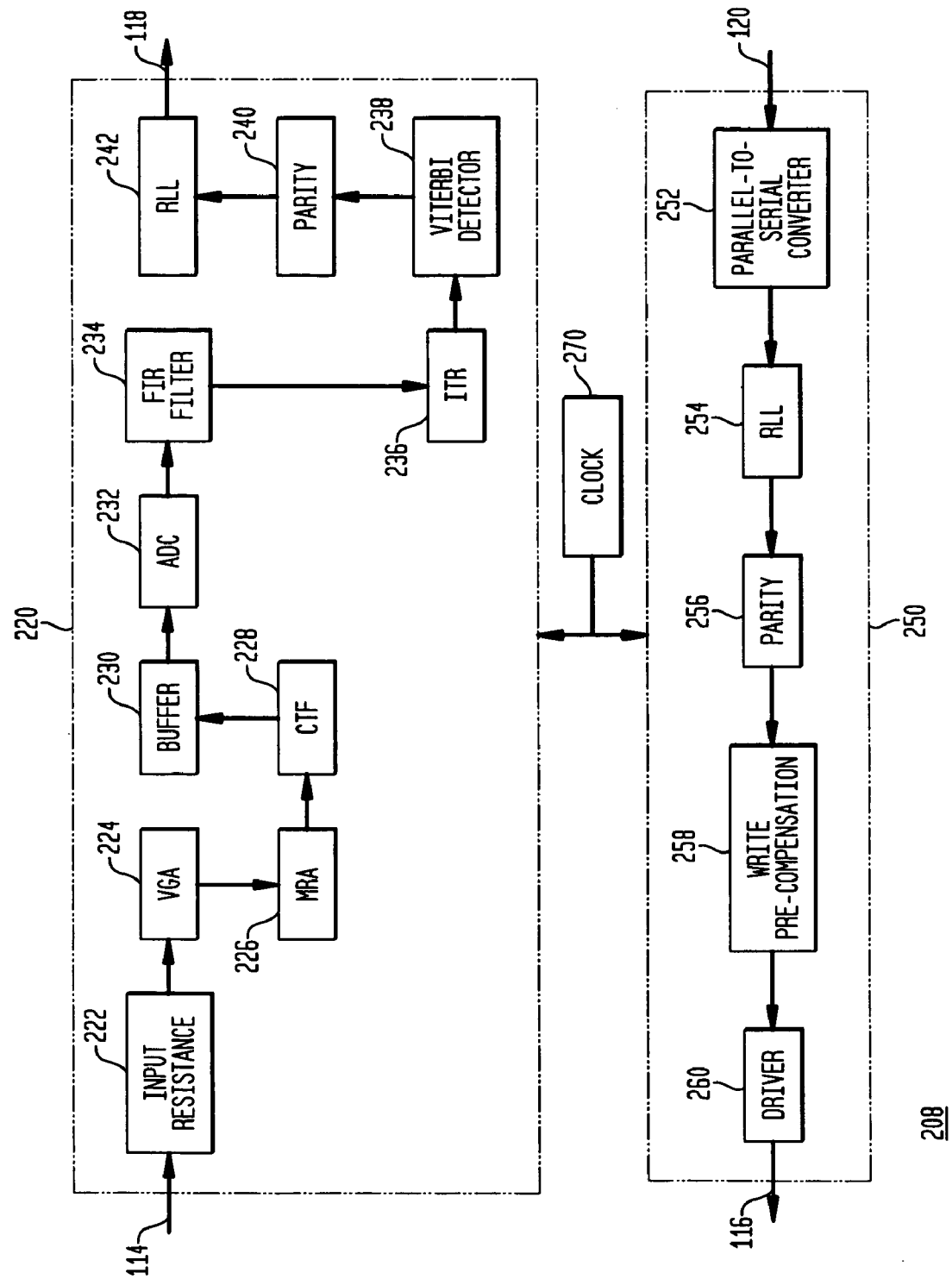
FIG. 2 shows a block diagram of a read/write channel that can be used in the disk drive shown in FIG. 1.

FIG. 2 shows a block diagram of a read/write channel 208 that can be used as read/write channel 108 in disk drive 100. Read/write channel 208 has a read path 220 and a write path 250. During a read operation, read path 220 converts analog signals received from the MR heads via interface 114 into the corresponding binary digital data that are output from read/write channel 208 via interface 118. Similarly, during a write operation, write path 250 converts binary digital data received from the host device via interface 120 into the corresponding analog signals that are output from read/write channel 208 via interface 116 and used to impart magnetic flux reversals onto magnetic platters. Read/write channel 208 also has a clock synthesizer 270 adapted to generate clock signals for the read and write paths. In one embodiment, read/write channel 208 is adapted to support Partial Response Maximum Likelihood (PRML) coding and is implemented in an integrated circuit manufactured using a complementary metal oxide semiconductor (CMOS) process.

Write path 250 includes a parallel-to-serial converter 252, a run-length-limited (RLL) encoder 254, a parity encoder 256, a write pre-compensation circuit 258, and a driver circuit 260. Parallel-to-serial converter 252 receives a parallel stream of data, e.g., eight bits per clock cycle, via interface 120, converts the parallel stream into a serial stream, and sends the serial stream to RLL encoder 254. RLL encoder 254 encodes the serial stream into symbolic binary sequences according to a known RLL algorithm. An exemplary RLL algorithm uses a 32/33-bit symbol code designed to ensure that flux reversals on the magnetic platter are optimally spaced and that long runs of data without flux reversals are avoided. The RLL-encoded data are then passed to parity encoder 256 configured to add parity bits to the data and convert the parity-encoded data into a corresponding analog signal. The analog signal is then applied to write pre-compensation circuit 258, which dynamically adjusts pulse widths/amplitudes in the analog signal to pre-compensate for signal distortions produced during the recording process. The adjusted analog signal is passed to driver circuit 260, which drives the read/write heads via interface 116. In one embodiment, driver circuit 260 is a pseudo emitter-coupled logic (PECL) driver circuit adapted to generate a differential output signal.

Read path 220 includes an attenuation circuit (input resistance) 222, a variable-gain amplifier (VGA) 224, a magneto-resistive asymmetry (MRA)-correcting circuit 226, a continuous time filter (CTF) 228, a buffer 230, an analog-to-digital converter (ADC) 232, a finite impulse response (FIR) filter 234, an interpolated timing recovery (ITR) circuit 236, a Viterbi detector 238, a parity decoder 240, and a run-length-limited (RLL) decoder 242. An amplified signal received via interface 114 from the read/write head is first passed through circuit 222 serving signal attenuation and impedance matching purposes. The output of circuit 222 is then coupled to VGA 224 configured to adjust the signal amplitude for further signal processing. The adjusted signal is applied to MRA circuit 226 designed to reduce signal imbalance present due to the magneto-resistive asymmetry effects in the read/write head. More details on the principles of operation and structure of MRA circuit 226 are given below.

The output of MRA circuit 226 is applied to CTF 228 to attenuate high-frequency noise and minimize aliasing into the baseband after sampling. ADC 232 receives, via buffer 230, the signal filtered by CTF 228, samples it, and converts it into a digital form. The digital signal is passed to FIR filter 234 (e.g., a 10-tap FIR filter) and timing recovery circuit 236. Timing recovery circuit 236 is connected in a feedback arrangement (not shown in FIG. 2) to FIR filter 234, MRA circuit 226, and VGA 224 to provide appropriate timing correction based on the frequency of the signal being processed. The digital signal is then applied to Viterbi detector 238 adapted to determine the binary bit pattern represented by the signal using a Viterbi algorithm. Parity decoder 240 then removes the parity bit from the determined bit pattern and RLL decoder 242 converts the result into a serial bit stream by applying a reverse run-length limited algorithm. The serial bit stream is then converted into a parallel stream (not shown) and output from read path 220 via interface 118.

The analog signal applied to read path 220 is essentially a series of alternating positive and negative voltage pulses. In an ideal situation, pulses of different polarity would have identical shapes/amplitudes, i.e. the shape of each pulse would be described by the time domain function $P(t)=bh(t)$, where $h(t)$ is a function determining the pulse shape and $b=\pm 1$ is a coefficient determining the pulse polarity. However, in practice, non-linear effects affecting the response of MR heads cause the amplitudes of positive and negative pulses to differ and vary across the pulse sequence. As already mentioned, this pulse disparity/variation adversely affects the performance of disk drives. MRA circuit 226 is designed to deal with this problem by reducing said pulse disparity/variation and providing a signal having pulses of substantially uniform amplitudes across the pulse sequence.

Figure 3:
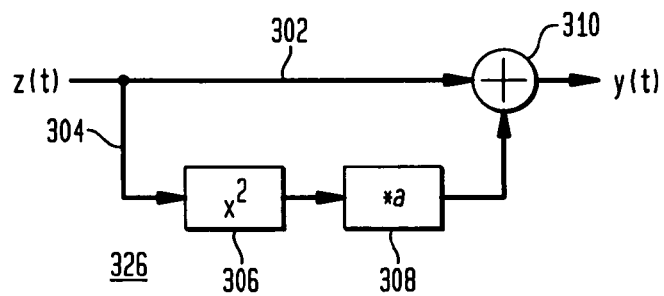
FIG. 3 shows a block diagram of a prior-art magneto-resistive asymmetry (MRA)-correcting circuit that can be used in the read/write channel shown in FIG. 2.

FIG. 3 shows a block diagram of a prior-art MRA circuit 326 disclosed in U.S. Pat. No. 6,633,447, the teachings of which are incorporated herein by reference, which circuit can be used as MRA circuit 226 in read/write channel 208. MRA circuit 326 is adapted to operate in conjunction with an MR head having substantially the following transfer function:

$$z(t)=x(t)+\alpha x(t)^2 \qquad (1)$$

where $x(t)$ and $z(t)$ are the input and output signals, respectively, of the MR head at time t, and $\alpha$ is a coefficient. For relatively small values of $\alpha$, the original non-distorted signal $x(t)$ can be recovered from the output signal $z(t)$ using the following second-order approximation:

$$y(t)=z(t)-\alpha z(t)^2 \qquad (2)$$

where $y(t)$ represents an approximated value of $x(t)$.

MRA circuit 326 is a mixer circuit that implements Eq. (2) to balance pulse amplitudes and, therefore, improve the operation of the disk drive. In MRA circuit 326, signal $z(t)$ received from, e.g., VGA 224 (FIG. 2), is sent along two different signal paths labeled 302 and 304 in FIG. 3. Signal path 304 includes (I) a square-term generator 306 adapted to square the applied signal and (II) a linear multiplier 308 adapted to multiply the output of the square-term generator by a constant (a). In a preferred configuration $a=-\alpha$. A summation circuit 310 then adds the signals received via the two signal paths to generate balanced signal $y(t)$, in which the pulse imbalance induced by the MR head is reduced.

One problem with MRA circuit 326 is that it can correct signal asymmetry only within a relatively narrow asymmetry range. Range limitations are due to the fact that the second-order approximation given by Eq. (2) breaks down at relatively high signal asymmetry, i.e., at a relatively large value of α. The breakdown manifests itself, for example, by the fact that, at certain α, signal y(t) produced in accordance with Eq. (2) acquires a different polarity than signal z(t), which is an obviously incorrect result. The present invention deals with this problem by using a higher-order approximation than that of Eq. (2). More specifically, in addition to the second-order correction term, certain embodiments of the invention provide a third-order correction term and, optionally, other high-order correction terms, which is generalized by Eq. (3a) as follows:

$$y(t)=z(t)+b_2 z(t)^2+b_3 z(t)^3+O(z(t)^4) \quad (3a)$$

where $O(z(t)^4)$ represents a sum of the optional high-order terms starting with the fourth order, and $b_2$ and $b_3$ are constants. In a preferred embodiment, the following constant values are used:

$$b_2 = -\alpha \quad (3b)$$

$$b_3 = \frac{\alpha^2}{2} \quad (3c)$$

One skilled in the art will appreciate that the approximation given by Eqs. (3a–c) holds for a wider range of α values than the approximation of Eq. (2). As a result, MRA circuits of the invention that implement Eq. (3) can correct signal asymmetry within a relatively wide asymmetry range.

Figure 4:
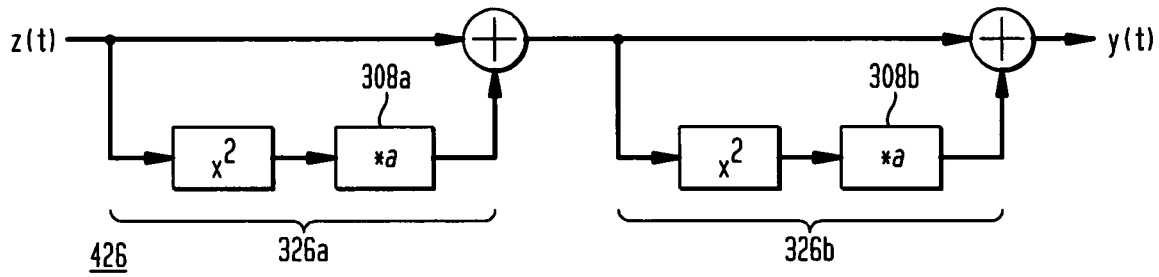
FIG. 4 shows a block diagram of an MRA circuit that can be used in the read/write channel shown in FIG. 2 according to one embodiment of the present invention.

FIG. 4 shows a block diagram of an MRA circuit 426 that can be used as MRA circuit 226 in read/write channel 208 according to one embodiment of the present invention. MRA circuit 426 has two cascaded circuits 326a–b. More specifically, signal z(t) applied to MRA circuit 426, e.g., by VGA 224 (FIG. 2), is applied to MRA circuit 326a, the output of which is then applied to MRA circuit 326b to generate balanced signal y(t). Assuming that the multiplication constant (a) of each of linear multipliers 308a–b is −c/2, where c is a constant, the transfer function of MRA circuit 426 is given by Eq. (4) as follows:

$$y(t) = z(t) - cz(t)^2 + \frac{c^2}{2}z(t)^3 - \frac{c^3}{8}z(t)^4 \quad (4)$$

Comparing Eqs. (3) and (4), one finds that Eq. (4) is a species of Eq. (3), wherein α=c and $O(Z(t)^4)$ is truncated at the fourth-order term.

Figure 5:
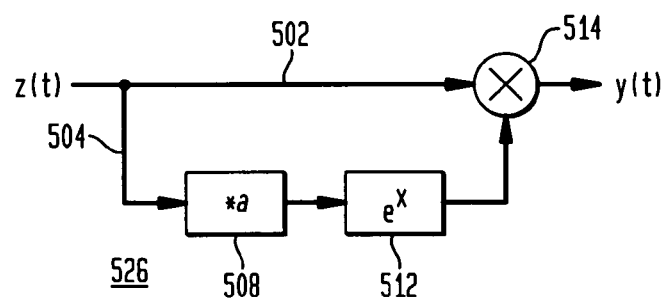
FIG. 5 shows a block diagram of an MRA circuit that can be used in the read/write channel shown in FIG. 2 according to another embodiment of the present invention.

FIG. 5 shows a block diagram of an MRA circuit 526 that can be used as MRA circuit 226 in read/write channel 208 according to another embodiment of the present invention. MRA circuit 526 is substantially a variable-gain amplifier. Signal z(t) applied to MRA circuit 526, e.g., by VGA 224 (FIG. 2), is sent along two signal paths labeled 502 and 504 in FIG. 4. Signal path 504 has (I) a linear multiplier 508 that is similar to linear multiplier 308 (FIG. 3) and (II) an exponential-term generator 512 adapted to generate an output signal having an amplitude substantially equal to the exponent of the input signal. A multiplier circuit 514 multiplies the signals received via the two paths to generate balanced signal y(t). Assuming that the multiplication constant of linear multiplier 508 is −c, the transfer function of MRA circuit 526 is given by Eq. (5) as follows:

$$y(t) = z(t)\exp(-cz(t)) = z(t) - cz(t)^2 + \frac{c^2}{2}z(t)^3 - \frac{c^3}{6}z(t)^4 + \ldots \quad (5)$$

Similar to Eq. (4), Eq. (5) is a species of Eqs. (3a–c), wherein α=c and $O(Z(t)^4)$ corresponds to the residual sum of a Taylor expansion series of the exponent.

Figure 6:
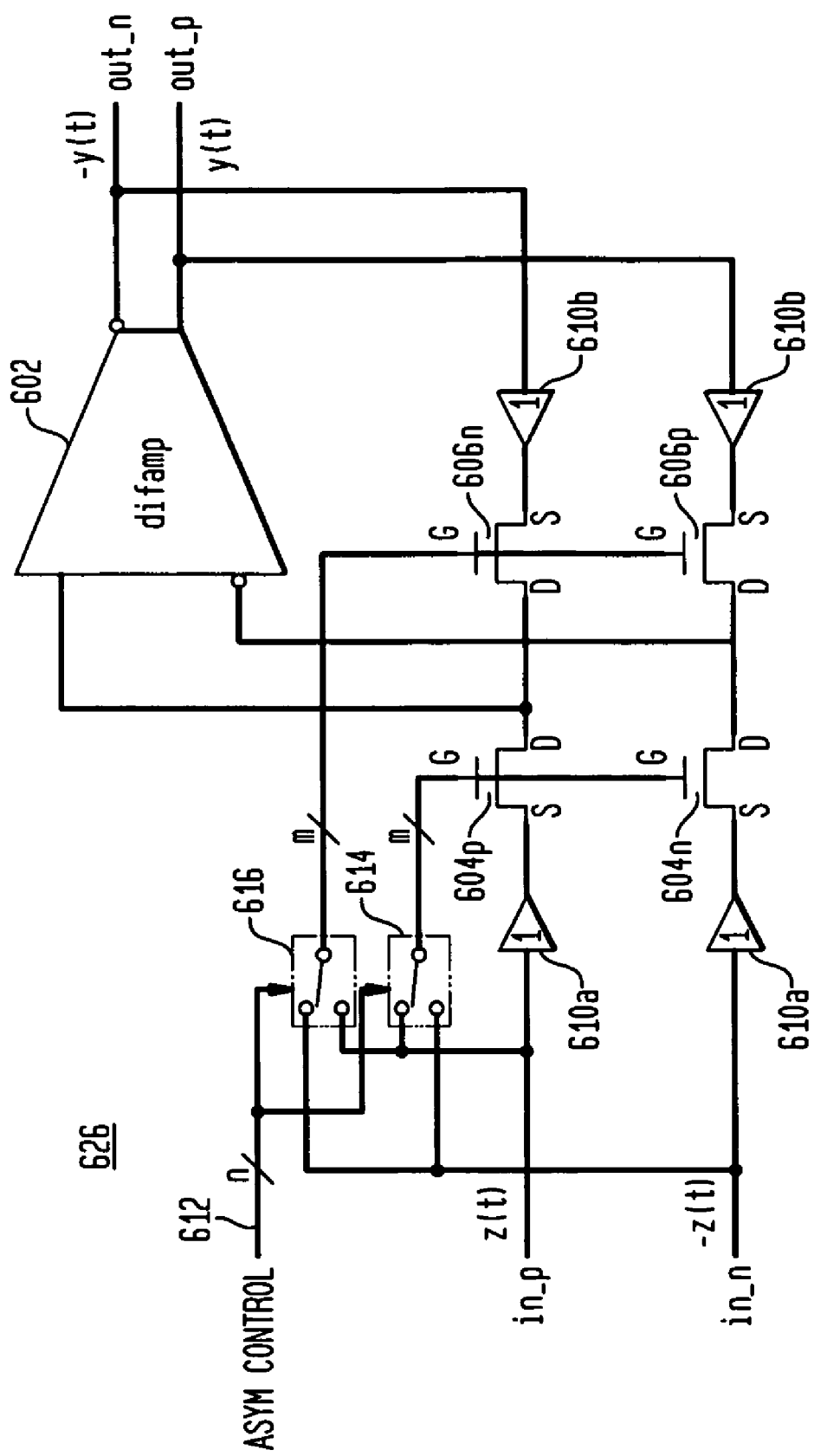
FIG. 6 shows a block diagram of an MRA circuit that can be used in the read/write channel shown in FIG. 2 according to yet another embodiment of the present invention.

FIG. 6 shows a block diagram of an MRA circuit 626 that can be used as MRA circuit 226 in read/write channel 208 according to yet another embodiment of the present invention. MRA circuit 626 is a differential variable-gain amplifier, which has two differential inputs, each input receiving a copy of input signal z(t) of appropriate polarity, and two differential outputs, each output having a copy of output signal y(t) of appropriate polarity. MRA circuit 626 includes a differential amplifier 602 in an inverting gain configuration whose gain is controlled by four MOS devices 604n, 604p, 606n, and 606p. Each MOS device 604 is an arrayed MOS transistor having a source (S), a drain (D), and a plurality of fingers (gates, G), each of which fingers controls a conducting channel between the source and the drain. Each MOS device 604 is connected to differential amplifier 602 such that its source-to-drain conductance provides an input resistance to the differential amplifier. More specifically, the source of each MOS device 604 receives, via the corresponding source follower 610a, input signal z(t) of appropriate polarity while its drain is connected to the appropriate input of differential amplifier 602. Similarly, each MOS device 606 is an arrayed MOS transistor having a source (S), a drain (D), and a plurality of fingers (gates, G), each of which fingers controls a conducting channel between the source and the drain. Each MOS device 606 is connected to differential amplifier 602 such that its source-to-drain conductance provides a feedback resistance to the differential amplifier. The source of each MOS device 606 receives, via the corresponding source follower 610b, output signal y(t) of appropriate polarity while its drain is connected to the drain of the corresponding MOS device 604 and to the corresponding input of differential amplifier 602.

The conductance between the source and the drain of each MOS device 604 and 606 is controlled by m (where, m>1) fingers (gates), each of which can be biased independent of other fingers. Switch sets 614 and 616, each controlled by a multi-bit (e.g., n-bit, where n>1) control signal 612, can couple each finger to the positive or negative input of MRA circuit 626. A representative circuit for generating control signal 612 is disclosed in U.S. Pat. No. 6,587,292, the teachings of which are incorporated herein by reference. Briefly, the circuit for generating multi-bit control signal 612 estimates an asymmetry error in the signal generated by the MR head coupled to MRA circuit 626 (e.g., read/write head 104 of FIG. 1), which provides an estimate for the value of α (see Eq. (1)). Multi-bit control signal 612 is generated based on this estimate and applied to switch sets 614 and 616 to connect the gates of MOS devices 604 and 606, respectively, to input signal ±z(t) to appropriately scale the influence of the input signal on the source-to-drain conductance of those MOS devices.

Each of switch sets 614 and 616 has m switches, each switch having two input ports and one output port. Each switch in switch set 614 is coupled to one finger in MOS device 604p and one finger in MOS device 604n. Similarly, each switch in switch set 616 is coupled to one finger in MOS device 606p and one finger in MOS device 606n. Based on multi-bit control signal 612, each switch couples a selected input port to the output port. As a result, the gates of MOS devices 604 and 606 are coupled to input signal z(t) of selected polarity and the conductance of those MOS devices becomes modulated with the input signal. In addition, finger connections provided by switch sets 614 and 616 are such that the conductance of MOS devices 604 and the conductance of MOS devices 606 change in a manner complementary to each other. More specifically, the conductance, σ, of each of MOS devices 604 and 606 is varied in accordance with Eqs. (6a) and (6b) as follows:

$$\sigma_{604} = \sigma_i \left(1 - \frac{c}{2} z(t)\right) \quad (6a)$$

$$\sigma_{606} = \sigma_f \left(1 + \frac{c}{2} z(t)\right) \quad (6b)$$

where c is a scaling factor corresponding to control signal 612, and $\sigma_i$ and $\sigma_f$ are constants. Therefore, when the conductance of MOS device 604 increases, the conductance of MOS device 606 decreases by a proportionate amount, and vice versa.

The gain, G, of differential amplifier 602 is determined by the input and feedback resistances, $R_{input}$ and $R_{feedback}$, provided by MOS devices 604 and 606, respectively. Using Eqs. (6a) and (6b) and the inverse relationship between resistance and conductance, one obtains the following expression for G:

$$G = \frac{R_{feedback}}{R_{input}} = g_0 \frac{1 - \frac{c}{2} z(t)}{1 + \frac{c}{2} z(t)} \quad (7)$$

where $g_0 = \sigma_i/\sigma_f$. In a representative implementation of MRA circuit 626, MOS devices 604 and 606 are designed such that the value of $g_0$ is approximately 1. However, it may be preferable to have $\sigma_i$ slightly larger than $\sigma_f$ to compensate for gain losses elsewhere in the signal path. Assuming $g_0=1$ and using the definition of G as y(t)/z(t), one arrives at the following transfer function for MRA circuit 626:

$$y(t) = z(t) \frac{1 - \frac{c}{2} z(t)}{1 + \frac{c}{2} z(t)} = z(t) - cz(t)^2 + \frac{c^2}{2} z(t)^3 - \frac{c^3}{4} z(t)^4 + \ldots \quad (8)$$

Similar to Eq. (4), Eq. (8) is a species of Eq. (3), wherein α=c and O(z(t)⁴) corresponds to the residual sum of a Taylor expansion series of the denominator multiplied by the numerator.

Figure 7:
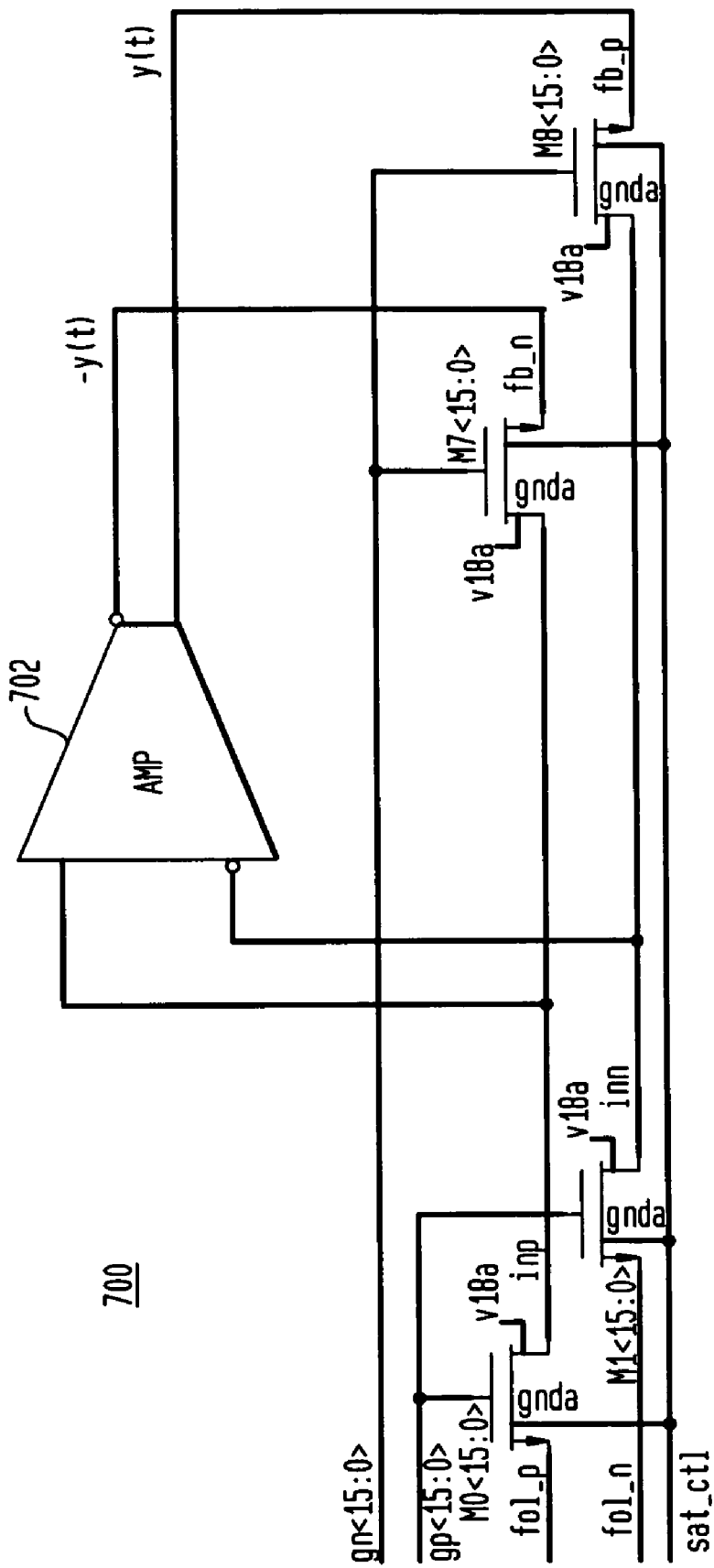
FIG. 7 shows a diagram of a circuit having four MOS devices that can be used in the MRA circuit shown in FIG. 6 according to one embodiment of the present invention.

FIG. 7 shows a diagram of a circuit 700 that can be used in MRA circuit 626 according to one embodiment of the present invention. More specifically, circuit 700 has four MOS devices M0, M1, M7, and M8 that can be used as MOS devices 604p, 604n, 606n, and 606p, respectively, in MRA circuit 626. In circuit 700, MOS devices M0, M1, M7, and M8 are coupled to a differential amplifier 702 that is analogous to differential amplifier 602 of FIG. 6. Each of MOS devices M0, M1, M7, and M8 is a MOS transistor having sixteen fingers (gates). Each finger is connected to a corresponding line in one of the buses labeled gn<15:0> and gp<15:0>, where the former controls the fingers of MOS devices M7 and M8 and the latter controls the fingers of MOS devices M0 and M1. Buses gn<15:0> and gp<15:0> connect MOS devices M0, M1, M7, and M8 to switch sets analogous to switch sets 614 and 616 of FIG. 6. Signals labeled sat_ctl and v18a provide appropriate bias voltages to each of MOS devices M0, M1, M7, and M8, and signals labeled fol_p and fol_n represent buffered, level-shifted versions of the input signal that are generated, e.g., by source followers 610a in FIG. 6.

In one embodiment, each of MOS devices M0, M1, M7, and M8 is implemented as a device analogous to sixteen NMOS transistors having a common source, a common drain, and sixteen separate gate nodes. Due to the source/drain sharing between adjacent transistors, this embodiment takes up a relatively small chip area. A preferred layout stile is similar to an inter-digitated (double-comb) layout style typically used to implement a single large NMOS transistor having a gate width/length ratio of about 1000, in which the source and the drain appear as alternating stripes separated by the gate areas. However, one difference between these two layouts is that, in the present invention, the gate areas are not connected together to form a single node, but rather, represent sixteen separate gates of sixteen transistors. Using device M0 as an example, the first stripe is the drain M0<0>; the second stripe is the source of M0<0> and simultaneously the source of M0<1>; the third stripe is the drain of M0<1> and simultaneously the drain of M0<2>, and so forth; and the last stripe is the drain of M0<15>. The gate of each transistor is located between the stripes serving as the source and drain of that transistor.

Figure 8A:
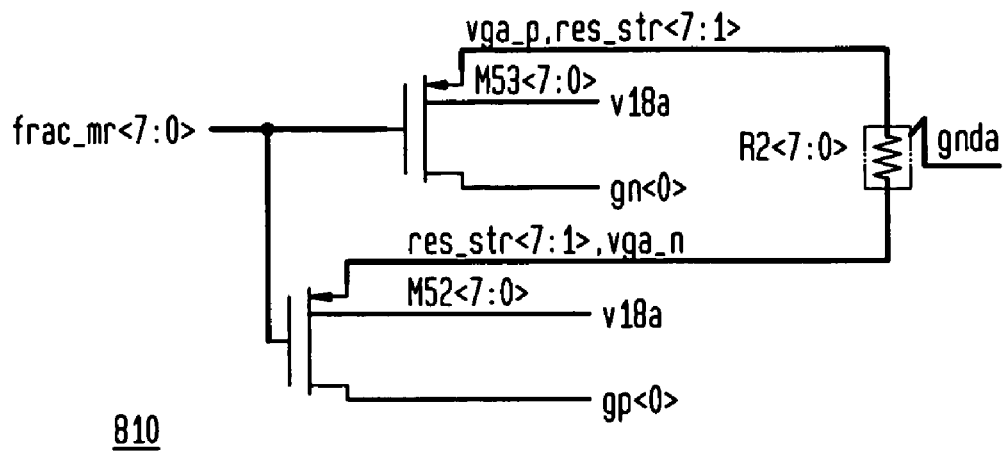
FIGS. 8A–B show diagrams of two circuits that can be used in the switch sets of the MRA circuit shown in FIG. 6 according to one embodiment of the present invention.
Figure 8B:
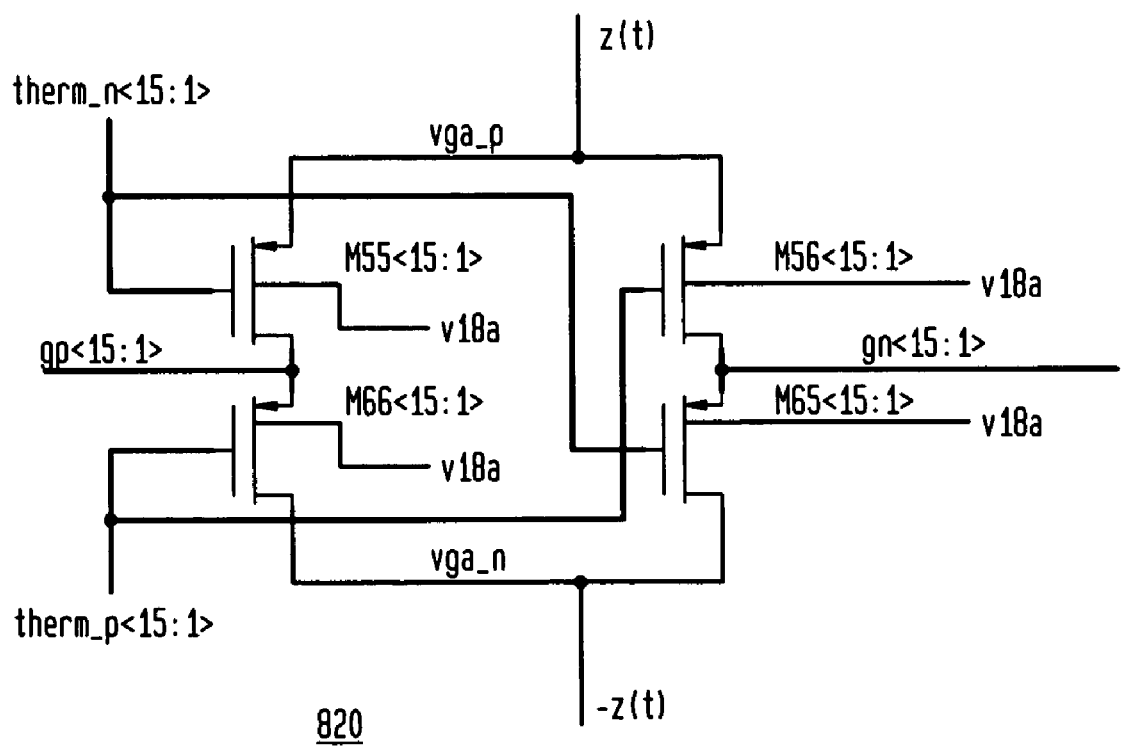

FIGS. 8A–B show diagrams of circuits 810 and 820 that can be used in switch sets 614 and 616 according to one embodiment of the present invention. More specifically, FIGS. 8A–B illustrate switch sets adapted for use in conjunction with circuit 700 of FIG. 7 to connect the differential input signal to buses gn<15:0> and gp<15:0>. Circuit 810 is adapted to connect the differential input signal to lines gn<0>an gp<0> of buses gn<15:0> and gp<15:0>, respectively, and, as such, can control one finger in each of MOS devices M0, M1, M7, and M8 of circuit 700. Circuit 820 is adapted to connect the input signal to lines gn<1> to gn<15> and gp<1> to gp<15> of buses gn<15:0> and gp<15:0>, respectively, and, as such, can control the remaining fifteen fingers in each of MOS devices M0, M1, M7, and M8 of circuit 700.

Referring to FIG. 8A, circuit 810 has a resistor divider R2<7:0> and two transistor sets M52<7:0> and M53<7:0>. Resistor divider R2<7:0> has two end terminals and seven intermediate terminals, which provides eight different resistor values, preferably in equal increments. Each of the end terminals receives the input signal of appropriate polarity via line vga_n or vga_p, while each of the intermediate terminals is connected to a corresponding line of a bus res_str<7:1>. Each of transistor sets M52<7:0> and M53<7:0> has eight transistors that are connected together at their drains. The drains in transistor set M52<7:0> are also connected to line gn<0> of bus gn<15:0>, and the drains in transistor set M53<7:0> are similarly connected to line gp<0> of bus gp<15:0>. The source of each transistor in transistor set M52<7:0> is coupled to resistor divider R2<7:0> via one of the lines in vga_n and res_str<7:1>, and the source of each transistor in transistor set M53<7:0> is similarly coupled to the resistor divider via one of the lines in vga_p and res_str<7:1>.

Each transistor in transistor sets M52<7:0> and M53<7:0> can be switched between the "on" and "off" states using a corresponding line of bus frac_mr<7:0> connected to the gate of that transistor. Signals applied to bus frac_mr<7:0> are generated, e.g., based on the three least significant digits of multi-bit control signal 612 (see FIG. 6) and are such that, at any given time, only one of those signals is active low. As a result, only one transistor in each transistor set is in the "on" state, which connects lines gn<0> and gp<0> to the corresponding terminals of resistor divider R2<7:0>. Since both transistor sets are controlled by bus frac_mr<7:0>, they provide complementary fractional switching of lines gn<0> and gp<0> between the levels corresponding to the negative and positive input signals. One skilled in the art will appreciate that this fractional switching can be used, for example, to provide fine adjustment to the value of the scaling factor that determines conductance changes in MOS devices 604 and 606 of MRA circuit 626 (see Eqs. (6a–b) and FIG. 6).

Referring to FIG. 8B, circuit 820 has four transistor sets M55<15:1>, M56<15:1>, M65<15:1>, and M66<15:1>, each having fifteen transistors. Transistors in transistor sets M55<15:1> and M56<15:1> are connected together at their sources, which are also connected to the positive input signal. Similarly, transistors in transistor sets M65<15:1> and M66<15:1> are connected together at their drains, which are also connected to the negative input signal. The drain of each transistor in transistor set M55<15:1> is connected to the source of a corresponding transistor in transistor set M66<15:1> and to the corresponding line in bus gp<15:1>. Similarly, the drain of each transistor in transistor set M56<15:1> is connected to the source of a corresponding transistor in transistor set M65<15:1> and to the corresponding line in bus gn<15:1>.

Each transistor in transistor sets M55<15:1>, M56<15:1>, M65<15:1>, and M66<15:1> can be switched between the "on" and "off" states using a corresponding line in buses therm_n<15:1> and therm_p<15:1> that is connected to the gate of that transistor. The signals applied to buses therm_n<15:1> and therm_p<15:1> can be generated, e.g., based on multi-bit control signal 612 (see FIG. 6) and are complementary to each other. More specifically, at any given time, only one of the two transistors connected to any line gn<k> of bus gn<15:1> or any line gp<k> of bus gp<15:1>, where $1 \leq k \leq 15$, is in the "on" state, thereby connecting that line to the input signal of the corresponding polarity. In addition, when any given line gn<k> of bus gn<15:1> is connected to the positive input signal, the corresponding line gp<k> of bus gp<15:1> is connected to the negative input signal, and vice versa. One skilled in the art will appreciate that the complementary switching implemented in circuit 820 can be used, for example, to provide complementary conductance changes in MOS devices 604 and 606 of MRA circuit 626 (and FIG. 6).

While this invention has been described with reference to illustrative embodiments, this description is not intended to be construed in a limiting sense. Although the present invention has been described in the context of CMOS technology, it will be understood that the present invention can be implemented using other technologies, such as nMOS, pMOS, or other non-MOS technologies. The substrates used in the circuits of the present invention may be made of any suitable semiconductor material, such as Si, GaAs, or InP, with different dopant types to form various structures. Although circuits of the present invention have been described as adapted to reduce signal asymmetry, one skilled in the art will appreciate that these circuits may also be adapted to change (i.e., increase or reduce) said signal asymmetry. Circuits of the invention may be used in conjunction with MR heads having a transfer function different from that given by Eq. (1). In general, circuits of the invention provide a signal contribution corresponding to an order of the input signal higher than the second order, which contribution may or may not include a third-order term. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

I claim:

1. Apparatus, comprising an asymmetry-changing circuit adapted to (i) process a first signal having positive and negative pulses and characterized by a first asymmetry and (ii) based on the first signal, generate a second signal having positive and negative pulses and characterized by a second asymmetry different from the first asymmetry, wherein:

the second signal is generated by providing a signal contribution corresponding to a higher-than-second order of the first signal;

the first signal has positive and negative pulses of different amplitudes;

the second signal has positive and negative pulses of substantially uniform amplitudes;

the asymmetry-changing circuit comprises an asymmetry-reducing circuit adapted to process the first signal and, based on the first signal, generate the second signal, wherein the second signal is generated by providing a signal contribution corresponding to a third order of the first signal; and the asymmetry-reducing circuit comprises:

a differential amplifier having two differential inputs and two differential outputs, wherein the second signal appears at the differential outputs; and a plurality of MOS devices connected to the differential inputs and outputs such that conductance of the MOS devices provides input and feedback resistances to the differential amplifier.

2. The apparatus of claim 1, wherein the second signal is generated by providing at least one of:

an additional signal contribution corresponding to a second order of the first signal; and further signal contributions corresponding to orders of the first signal higher than the third order.

3. The apparatus of claim 1, wherein the asymmetry-reducing circuit further comprises a switch set adapted to couple the MOS devices to the first signal to modulate the conductance of the MOS devices with the first signal such that the input and feedback resistances are modulated in a complementary manner.

4. The apparatus of claim 3, wherein:

each MOS device comprises an arrayed MOS transistor having a source, a drain, and a plurality of fingers adapted to control source-to-drain conductance of said transistor, said source-to-drain conductance determining the conductance of the MOS device; and the switch set is adapted to couple the fingers to the first signal such that, for each MOS device, the coupling of any two fingers is independent of each other.

5. The apparatus of claim 4, wherein the switch set has at least one switch adapted to couple a corresponding finger to a signal selected from positive and negative copies of the first signal.

6. The apparatus of claim 4, wherein the switch set has at least one switch adapted to couple a corresponding finger to a signal corresponding to a fraction of a difference between positive and negative copies of the first signal.

7. The apparatus of claim 3, wherein the switch set is controlled by a control signal generated based on the amplitude differences in the first signal.

8. The apparatus of claim 1, wherein the plurality of MOS devices comprises first, second, third, and fourth MOS devices, wherein:
the first and second MOS devices provide the feedback resistances; and
the third and fourth MOS devices provide the input resistances.

9. The apparatus of claim 8, wherein:
each MOS device has a source and a drain; and
for the first MOS device:
the source is adapted to receive a signal corresponding to a positive copy of the first signal; and
the drain is connected to a first differential input;
for the second MOS device:
the source is adapted to receive a signal corresponding to a negative copy of the first signal; and
the drain is connected to a second differential input;
for the third MOS device:
the source is coupled to a first differential output; and
the drain is connected to the first differential input and the drain of the first MOS device; and
for the fourth MOS device:
the source is coupled to a second differential output; and
the drain is connected to the second differential input and the drain of the second MOS device.

10. The apparatus of claim 9, wherein:
the signal received by the source of the first MOS device is generated by a first source follower;
the signal received by the source of the second MOS device is generated by a second source follower;
the source of the third MOS device is coupled to the first differential output via a third source follower; and
the source of the fourth MOS device is coupled to the second differential output via a fourth source follower.

11. The apparatus of claim 1, wherein:
the first signal corresponds to a signal generated by a read head of a magnetic disk drive; and
the asymmetry-reducing circuit is implemented in an integrated circuit and is a part of read/write channel of the magnetic disk drive.

12. A method of reducing signal asymmetry, comprising:
(A) receiving a first signal having positive and negative pulses of different amplitudes; and
(B) based on the first signal, generating a second signal having positive and negative pulses of substantially uniform amplitudes, wherein:
the second signal is generated by providing a signal contribution corresponding to a greater-than-second order of the first signal; and
step (B) comprises modulating a gain of a variable-gain amplifier by the first signal, wherein the variable-gain amplifier is adapted to implement substantially the following transfer function:

$y(t)=z(t)\exp(-cz(t))$, where $z(t)$ denotes the first signal, $v(t)$ denotes the second signal, and c is a constant corresponding to the amplitude differences in the first signal.

13. The method of claim 12, wherein, in step (B), the second signal is generated by providing a signal contribution corresponding to a third order of the first signal.

14. Apparatus, comprising an asymmetry-changing circuit adapted to (i) process a first signal having positive and negative pulses and characterized by a first asymmetry and (ii) based on the first signal, generate a second signal having positive and negative pulses and characterized by a second asymmetry different from the first asymmetry, wherein:
the second signal is generated by providing a signal contribution corresponding to a higher-than-second order of the first signal;
the first signal has positive and negative pulses of different amplitudes;
the second signal has positive and negative pulses of substantially uniform amplitudes;
the asymmetry-changing circuit comprises an asymmetry-reducing circuit adapted to process the first signal and, based on the first signal, generate the second signal, wherein the second signal is generated by providing a signal contribution corresponding to a third order of the first signal; and
the asymmetry reducing circuit comprises two serially connected circuits, wherein each of the serially connected circuits is adapted to generate an output signal corresponding to a second-order function of a signal applied to said serially connected circuit.

15. The apparatus of claim 14, wherein:
each of the serially connected circuits comprises two signal paths coupled to a summation circuit adapted to generate the output signal by adding signals received via the two paths; and
one of the signal paths comprises (I) a square-term generator adapted to square an applied signal and (II) a linear multiplier adapted to multiply a signal produced by the square-term generator by a constant.

16. Apparatus, comprising an asymmetry-changing circuit adapted to (i) process a first signal having positive and negative pulses and characterized by a first asymmetry and (ii) based on the first signal, generate a second signal having positive and negative pulses and characterized by a second asymmetry different from the first asymmetry, wherein:
the second signal is generated by providing a signal contribution corresponding to a higher-than-second order of the first signal;
the first signal has positive and negative pulses of different amplitudes;
the second signal has positive and negative pulses of substantially uniform amplitudes;
the asymmetry-changing circuit comprises an asymmetry-reducing circuit adapted to process the first signal and, based on the first signal, generate the second signal, wherein the second signal is generated by providing a signal contribution corresponding to a third order of the first signal; and
the asymmetry-reducing circuit comprises two signal paths coupled to a multiplier circuit adapted to generate the second signal by multiplying signals received via the two paths, wherein one of the signal paths comprises (I) a linear multiplier adapted to multiply the first signal by a constant and (II) an exponential-term generator adapted to generate an output signal having an amplitude substantially equal to the exponent of a signal produced by the linear multiplier.

17. A method of reducing signal asymmetry, comprising:
(A) receiving a first signal having positive and negative pulses of different amplitudes; and
(B) based on the first signal, generating a second signal having positive and negative pulses of substantially uniform amplitudes, wherein:
   the second signal is generated by providing a signal contribution corresponding to a greater-than-second order of the first signal; and
   step (B) comprises modulating a gain of a variable-gain amplifier by the first signal, wherein the variable-gain amplifier is adapted to implement substantially the following transfer function:

$$y(t) = z(t)\frac{1 - \frac{c}{2}z(t)}{1 + \frac{c}{2}z(t)},$$

where $z(t)$ denotes the first signal, $y(t)$ denotes the second signal, and $c$ is a constant corresponding to the amplitude differences in the first signal.

* * * * *

UNITED STATES PATENT AND TRADEMARK OFFICE
CERTIFICATE OF CORRECTION

PATENT NO.         : 7,092,180 B2                                          Page 1 of 1
APPLICATION NO. : 10/817408
DATED              : August 15, 2006
INVENTOR(S)        : Stephen J. Franck It is certified that error appears in the above-identified patent and that said Letters Patent is hereby corrected as shown below:

In column 12, on line 1, replace "v(t)" with --y(t)--.

Signed and Sealed this

Twenty-first Day of November, 2006

JON W. DUDAS
*Director of the United States Patent and Trademark Office*